United States Patent [19]

Oguro et al.

[11] Patent Number: 4,577,733
[45] Date of Patent: Mar. 25, 1986

[54] DRUM BRAKE OR CLUTCH

[75] Inventors: Tadayuki Oguro, Oobu; Teturo Yoshimoto; Hazime Niki, both of Nagoya, all of Japan

[73] Assignees: Nisshin Spinning Co., Ltd.; Sumitomo Heavy Industries Ltd., both of Tokyo, Japan

[21] Appl. No.: 615,648

[22] Filed: May 31, 1984

[30] Foreign Application Priority Data

May 31, 1983 [JP] Japan .................. 58-96661

[51] Int. Cl.4 .................. F16D 65/24
[52] U.S. Cl. .................. 188/217; 188/334; 188/341
[58] Field of Search .............. 188/79.5 S C, 217, 326, 188/327, 331, 334, 341, 78

[56] References Cited

U.S. PATENT DOCUMENTS

| | | | |
|---|---|---|---|
| 1,936,865 | 11/1933 | Taylor | 188/341 |
| 2,326,177 | 8/1943 | Schnell | 188/78 |
| 2,382,268 | 8/1945 | Stelzer | 188/331 X |
| 2,822,065 | 2/1958 | Goepfrich et al. | 188/326 |
| 2,867,297 | 1/1959 | White | 188/326 |
| 3,708,044 | 1/1973 | Torri et al. | 188/326 |
| 4,015,694 | 4/1977 | Danko et al. | 188/331 X |

FOREIGN PATENT DOCUMENTS 591357 4/1959 Italy .................. 188/341

Primary Examiner—Duane A. Reger
Attorney, Agent, or Firm—Armstrong, Nikaido, Marmelstein & Kubovcik

[57] ABSTRACT

A drum brake or clutch has a fixing member, a drum adapted to be rotatable relative to the fixing member, a pair of arcuate shoes disposed within the drum such as to come in and out of contact with the drum, an actuating device attached to the fixing member and having an actuator adapted to act on at least one end of each of the shoes, and a return spring acting such as to separate each of the shoes from the drum. The drum brake or clutch further includes a lever member pivotally attached to one end portion of each of the shoes. The lever member has one end thereof engaged with the actuator of the actuating device and the other end thereof engaged with an abutment member provided on the fixing member.

2 Claims, 6 Drawing Figures

DRUM BRAKE OR CLUTCH

BACKGROUND OF THE INVENTION

The present invention relates to an improvement in a brake or clutch mechanism in which shoes slidably contact the inner surface of a drum. More particularly, the invention pertains to a booster mechanism for a drum brake or clutch constituted by two sets of actuating devices and shoes disposed in substantially point or line symmetry with each other, or a booster mechanism for a drum brake or clutch in which an actuating device is disposed between one of the respective ends of two shoes adjacently facing each other, and the other ends thereof are pivotally supported.

A drum brake or clutch which employs a booster mechanism as an actuating mechanism therefor has hitherto been known. The known booster mechanism, however, has such disadvantages that the booster member thereof is large in size and weight as well as high in cost. In addition, since the booster member effects only a pivotal motion with respect to a fixing member, it is disadvantageously difficult to employ the booster mechanism for a floating type shoe.

SUMMARY OF THE INVENTION

Accordingly, it is a primary object of the invention to provide a brake or clutch having a booster mechanism which is simple in structure and permits the same components to be employed commonly to construct booster mechanisms for two shoes working in opposite directions, thereby to overcome the above-described disadvantages of the prior art.

To this end, according to the invention, there is provided a drum brake or clutch of the type having a fixing member, a drum adapted to be rotatable relatively to the fixing member, a pair of arcuate shoes disposed within the drum such as to come in and out of contact with the drum, an actuating device attached to the fixing member and having an actuator adapted to act on at least one end of each of the shoes, and a return spring acting such as to separate each of the shoes from the drum, wherein said brake or clutch comprises a lever member which is pivotally attached to one end portion of each of the shoes and which has one end thereof engaged with the actuator of the actuating device and the other end thereof engaged with an abutment member provided on the fixing member.

The above and other objects, features and advantages of the invention will become clear from the following description of the preferred embodiments thereof taken in conjunction with the accompanying drawings.

DESCRIPTION OF THE PREFERRED EMBODIMENTS

Figure 1:
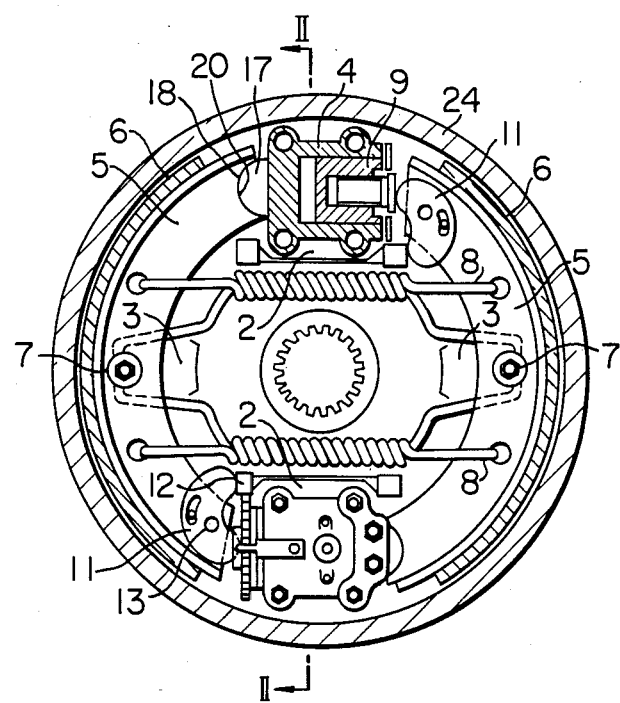
FIG. 1 is a partially cutaway schematic front elevational view of an embodiment of the invention.
Figure 2:
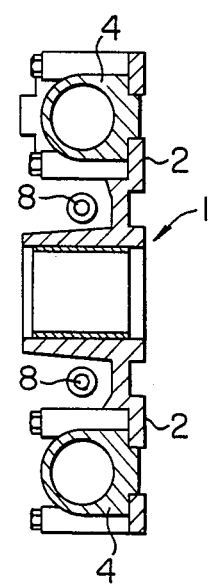
FIG. 2 is a sectional view taken along the line II—II of FIG. 1.
Figure 3:
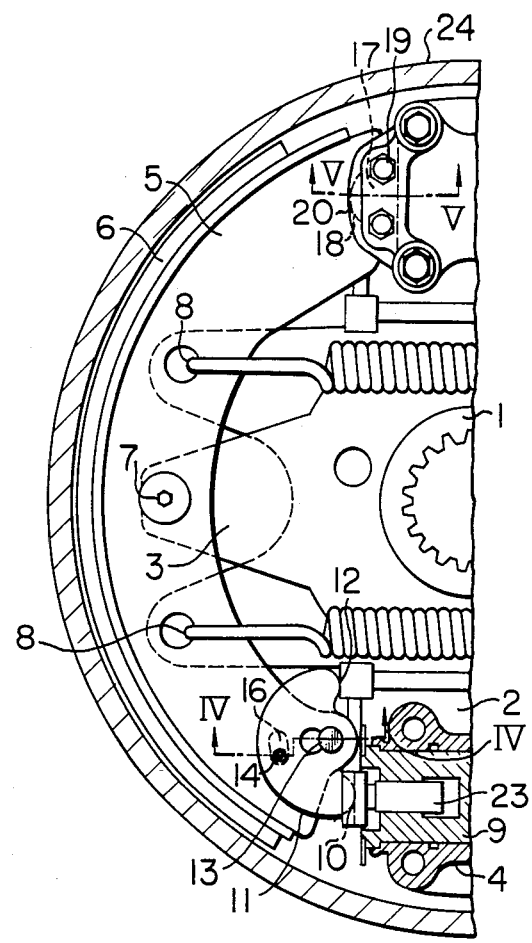
FIG. 3 is a partially cutaway front elevational view of the embodiment of FIG. 1, showing the left half thereof in detail.
Figure 4:
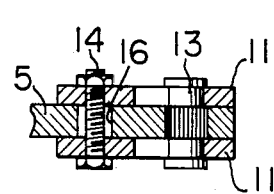
FIG. 4 is a sectional view taken along the line IV—IV of FIG. 3.

An embodiment of the invention will be described hereinunder with reference to the accompanying drawings.

A fixing member 1 has a pair of first fixing parts 2 and a pair of second fixing parts 3 which are disposed in substantially point symmetry with each other while radially projecting in the opposite directions. Each of the first fixing parts 2 is provided with an actuating device, for example, a hydraulic cylinder 4, while each of the second fixing parts 3 has a shoe 5 which is supported by a supporting part 7 such that the shoe 5 is movable in the radial direction and the inclination thereof with respect to the plane perpendicular to the central axis of a drum 24 can be adjusted and restricted. The shoe 5 is circular arc in shape and has a lining 6 attached to its outer periphery.

The shoe 5 is provided with two springs 8, 8 interposing therebetween the supporting part 7 which connects the shoe 5 and the second fixing part 3. Both the springs 8 constantly urge the shoe 5 so that the shoe 5 is pulled toward the center of the drum 24. The shoe 5 has one end in the longitudinal direction thereof adapted to be moved toward and away from the drum 24 by a piston 9 (actuator) of the hydraulic cylinder 4. The other end of the shoe 5 is pivotally supported by an engaging part formed on the side, remote from the piston 9, of the hydraulic cylinder 4 mounted on the first fixing part 2 for the other shoe 5.

Each hydraulic cylinder 4 and the end of the corresponding shoe 5 which is closer to the piston 9 are engaged with each other as follows.

A rod 23 having at its distal end an abutment surface 10 is screwed into the piston 9 of the hydraulic cylinder 4. The abutment surface 10 is contacted by one end of a lever or booster member 11 of substantially semicircular shape supported at its central portion by the end portion of the shoe 5 through a pin 13. The other end of the booster member 11 abuts on an abutment part 12 provided near the proximal end of the first fixing part 2.

The booster member 11 is supported at two portions thereof by the shoe 5. More specifically, one portion of the booster member 11 is supported by the pin 13, and the other portion by a bolt-nut means 14 through a slot 16 provided in the shoe 5. Thus, both the bolt-nut means 14 and the slot 16 extending in the direction substantially perpendicular to the expanding direction of the shoe 5 allow the shoe 5 to be expanded and contracted as well as the booster member 11 to pivot.

On the other hand, the end of the shoe 5 remote from the piston 9 thereof is pivotally supported through the engagement between a concave or convex engaging part 20 formed at the end of the shoe 5 and a convex or concave engaging part 18 formed at the distal end of a support member 17 provided on the hydraulic cylinder 4. It is to be noted that the shapes of the engaging parts 18, 20 are not limitative with respect to the above-mentioned combination of the convex and concave shapes and, although such is not shown, a floating support structure may be employed such that the end of the shoe 5 is formed with a gentle convex surface and is contacted by a flat surface formed on the side of the hydraulic cylinder 4 thereby allowing the shoe end to be slidable and pivotal.

Figure 5:
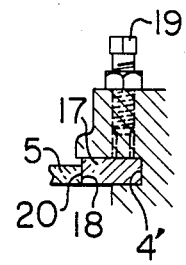
FIG. 5 is a sectional view taken along the line V—V of FIG. 3.

As shown in FIG. 5, the support member 17 having the engaging part 18 is fitted in a U-shaped groove 4' formed in the side of the hydraulic cylinder 4 remote from the piston 9 thereof and is secured by means of a bolt 19. Since the support member 17 can be tightened and loosened by the bolt 19, it is possible to vary the mounting position of the support member 17 with respect to the U-shaped groove 4'.

The following is a description of the operation of the invention having the above-described construction.

When a pressure oil is supplied to the hydraulic cylinder 4 (actuating device), the piston 9 (actuator) is projected to move one end of the booster member 11 in the shoe-expanding direction through the abutment surface 10 of the rod 23. In this case, since the other end of the booster member 11 is in contact with the abutment part 12 provided on the fixing part 2, the booster member 11 is pivoted about the point of contact with the abutment part 12 as the pivot. In addition, since the booster member 11 is connected at its intermediate portion with the shoe 5 through the pin 13, the pivoting of the booster member 11 causes the shoe 5 to pivot (move in the direction in which the shoe 5 is expanded) about the engaging part 20 as the pivot. It is to be noted that the bolt-nut means 14 moves relatively along the slot 16 to allow the booster member 11 to pivot.

Thus, when the booster member 11 is pivoted by the piston 9, since the shoe 5 is connected to the booster member 11 at an intermediate portion thereof, the shoe 5 receives a cylinder force which is transmitted thereto after being boosted in proportion to the ratio between the distance between the abutment part 12 and the abutment surface 10 and the distance between the abutment part 12 and the pin 13 according to the principles of the lever.

On the other hand, the other end of the shoe 5 is pivotally supported through the engagement between the engaging part 20 and the engaging part 18 of the support member 17. Therefore, the shoe 5 pivots toward the drum 25 about the engaging part 20 to effect a brake or clutch operation. When the lining 6 of the shoe 5 is worn, the clearance between the inner surface of the drum 24 and the shoe 5 (the lining 6) increases. In consequence, to obtain the same brake or clutch force, it is necessary to further project the piston 9 of the hydraulic cylinder 4 corresponding to the wear of the lining 6, so that a lag is produced in the brake or clutch operation. In order to eliminate the operation lag, the position of the rod 23 is properly moved to adjust (reduce) the clearance between the shoe 5 and the drum 24. When the shoes 5 are mounted, the positioning of each shoe 5 with respect to the drum 24 is effected in such a manner that the bolt 19 is untightened to move the position of the support member 17 by a required distance, and the bolt 19 is then tightened to fix the position of the support member 17.

As described above, the shoe 5 is adapted to move toward and away from the drum 24 with the engaging part 20 as the pivot. Therefore, in mounting the shoe 5, if the positioning of the support member 17 is effected such that the clearance between the circumferential side of the lining 6 and the drum 24 is uniform, then there is no possibility that the shoe 5 may contact the drum 24 to cause dragging in an inoperative state, and the lining 6 properly contacts the drum 24 in an operative state. Further, when the lining 6 has become worn such as to produce a lag in operation, it is only necessary to adjust the position of the rod 23 screwed to the piston 9, and there is no need for changing the position of the support member 17.

Figure 6:
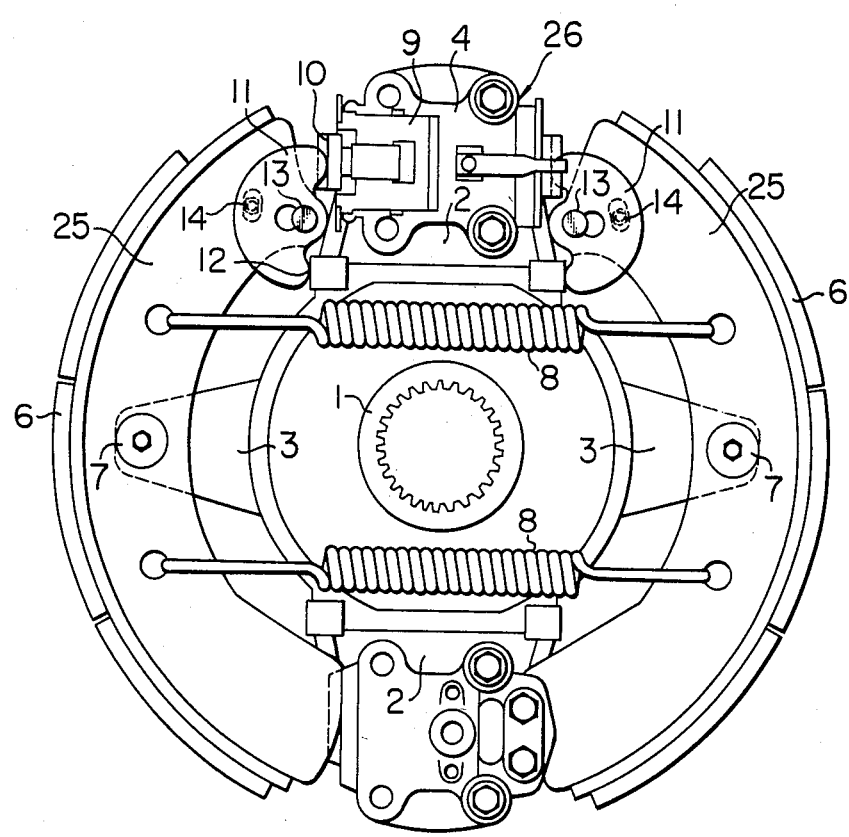
FIG. 6 is a partially cutaway front elevational view of another embodiment of the invention.

It is to be noted that, although in the above-described embodiment the drum brake or clutch is constituted by a pair of arcuate shoes and a pair of actuating devices disposed within the drum in point symmetry with each other, it is, as a matter of course, possible to obtain the same effect by applying the invention to a drum brake or clutch in which, as shown in FIG. 6, an actuating device 26 is provided between one of the respective ends, adjacently facing each other, of a pair of shoes 25 disposed within the drum in line symmetry with each other and the other ends of the shoes 25 are adapted to be pivotal or both slidable and pivotal. In such case, it will be obvious from the gist of the invention that either a single or two actuating devices 26 may be employed.

As has been described, according to the invention, the cylinder force is boosted since it is transmitted to the shoe 5 through the booster member. Therefore, it is possible to obtain a strong brake or clutch force. In addition, the booster member is small in size and lightweight as well as being easily mounted to the shoe. Further, since in the brake or clutch operation the booster member moves with the shoe in one unit about the pin provided on the shoe as the pivot while sliding on the abutment part 12, it is possible to employ the booster member for not only the fixed anchor type shoe as shown in the embodiments but also the floating type show. Furthermore, since the abutment part contacted by one end of the booster member is formed on the fixing member, there is no need for subjecting the cylinder to any special machining, and a general-purpose cylinder can be used in common. Accordingly, it is, advantageously, only necessary to add the booster member in order to construct the booster mechanism.

What is claimed is:

1. A torque-transmitting friction device comprising:
   (a) a fixing member;
   (b) a drum adapted to be rotatable relative to said fixing member;
   (c) a pair of actuating devices attached to said fixing member in point symmetry with each other with respect to the center of said drum, said actuating device having a primary bore blanked at one end;
   (d) a pair of abutment members projecting from said fixing member inward of said actuating devices;
   (e) a pair of arcuate shoes disposed within said drum adjacent to the inner surface of said drum;
   (f) one or more return springs acting to separate each of said shoes from said drum;
   (g) an actuator piston slidably mounted within each of said actuating devices carrying an abutment surface adjustably retained within said piston; and
   (h) a pair of lever members, each pivotally attached to a pin securely attached to one end portion of each of said shoes, said lever member engaging said abutment member at one end and said actuator abutment surface at the opposite end, said lever member being located upon said shoe by a bolt and nut means carried in a slot in said shoe.

2. A torque-transmitting friction device comprising:
   (a) a fixing member;
   (b) a drum adapted to be rotatable relative to said fixing member;
   (c) a pair of actuating devices attached to said fixing member in point symmetry with each other with respect to the center of said drum, said actuating device having a primary bore blanked at one end;
   (d) a pair of abutment members projecting from said fixing member inward of said actuating devices;

(e) a pair of arcuate shoes disposed within said drum adjacent to the inner surface of said drum;

(f) one or more return springs acting to separate each of said shoes from said drum;

(g) an actuator piston slidably mounted within each of said actuating devices carrying an abutment surface adjustably retained within said piston;

(h) a pair of lever members, each pivotally attached to a pin securely attached to one end portion of each of said shoes, said lever member engaging said abutment member at one end and said actuator abutment surface at the opposite end, said lever member being located upon said shoe by a bolt and nut means carried in a slot in said shoe; and (i) a pair of support members adjustable mounted upon said fixing member in point symmetry with each other with respect to the center of said drum, said support members having a curved surface to engage and support a complimentary curved surface formed in the end of each of said arcuate shoes opposite to the point of engagement of said lever member.

* * * * *